Aug. 31, 1937.　　　　F. E. RUNGE　　　　2,091,525
FILM REEL
Filed Dec. 29, 1934　　　　2 Sheets-Sheet 1
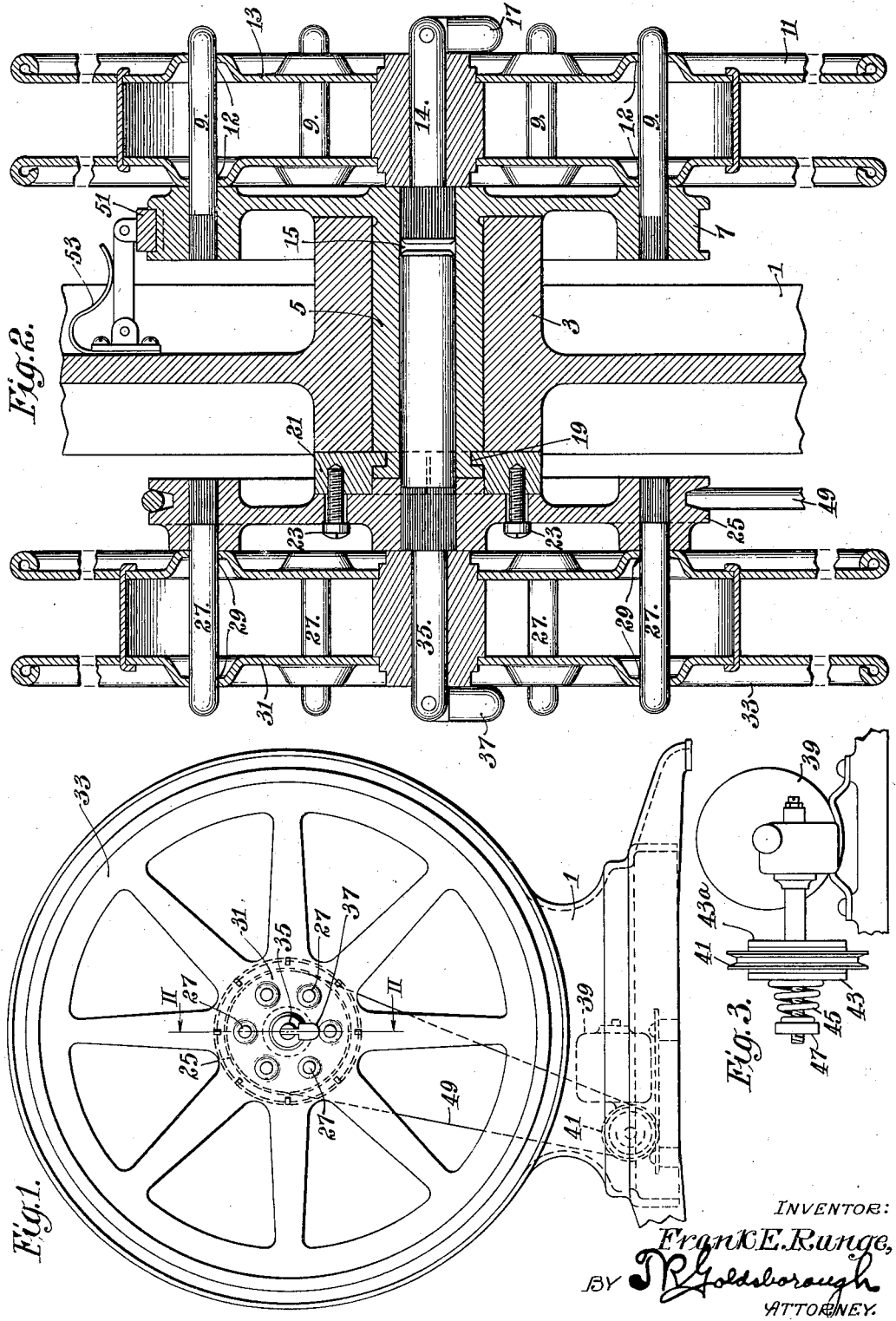
INVENTOR:
Frank E. Runge,
BY T. R. Goldsborough
ATTORNEY.

Aug. 31, 1937.  F. E. RUNGE  2,091,525
FILM REEL
Filed Dec. 29, 1934   2 Sheets-Sheet 2
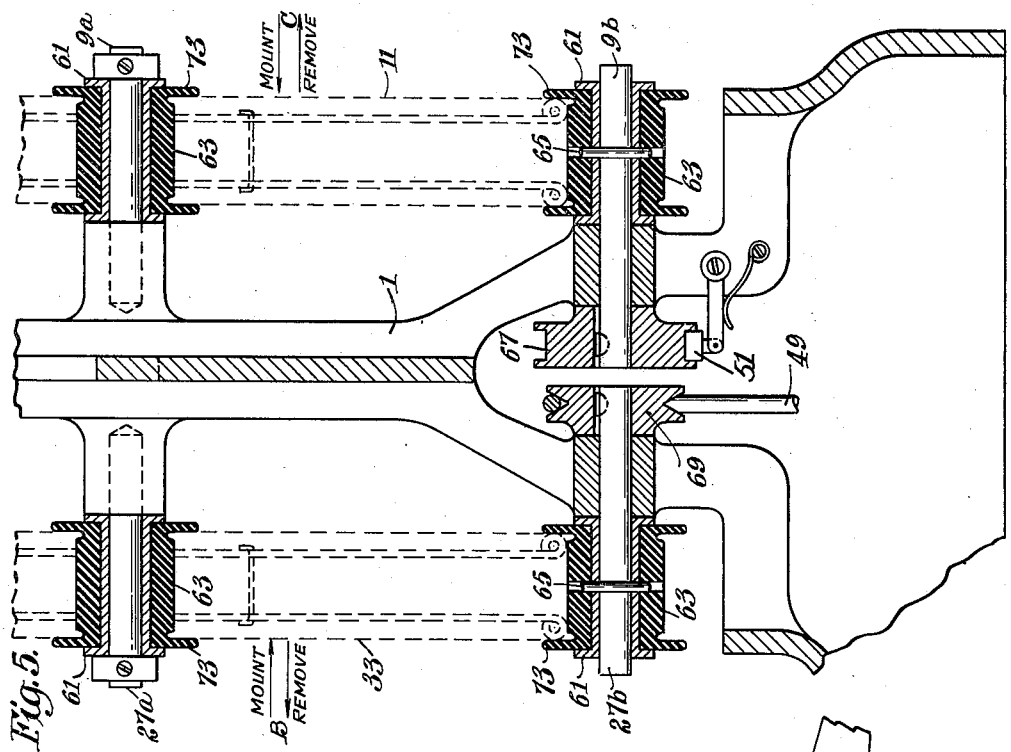
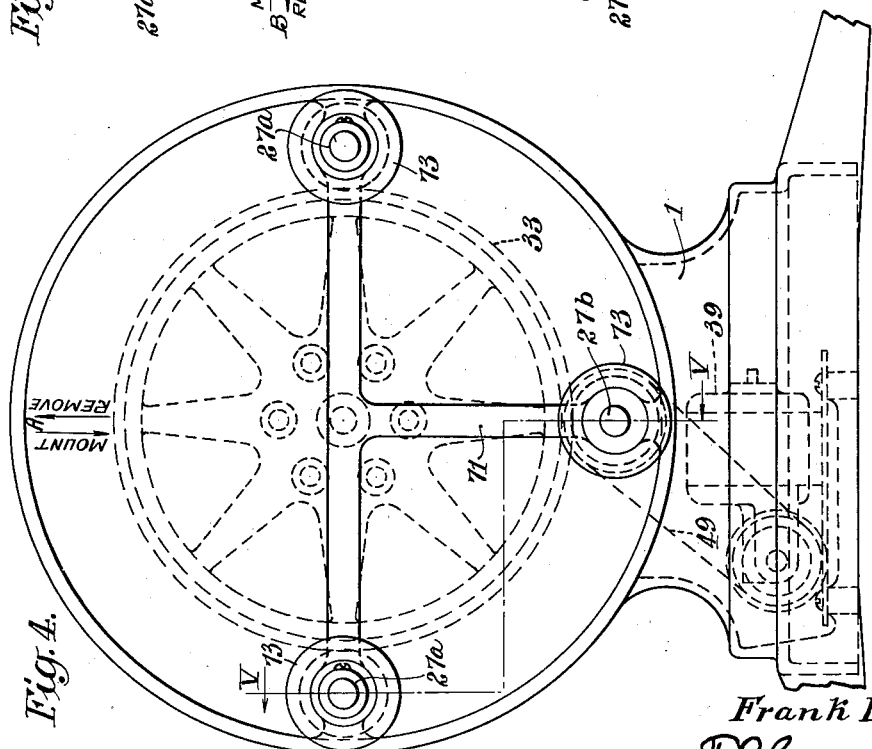
INVENTOR
Frank E. Runge
BY T. R. Goldsborough
ATTORNEY Patented Aug. 31, 1937

2,091,525

UNITED STATES PATENT OFFICE 2,091,525

FILM REEL

Frank E. Runge, Oaklyn, N. J., assignor to Radio Corporation of America, a corporation of Delaware Application December 29, 1934, Serial No. 759,663

5 Claims. (Cl. 242—55)

This invention relates to film handling apparatus, and more particularly to film reels for use in moving picture apparatus together with mounting and driving means therefor.

It is well known that commercial moving picture films in use today are made in a number of strips, each wound upon a separate reel and run off consecutively to provide a complete performance. Under certain circumstances, it is desirable to form the entire presentation upon a single length of film of a length equal to the continued lengths of the aforesaid individual strips. Such a length of film can, of course, only be accommodated upon a reel of comparatively large diameter, and the weight and size thereof plus the weight of the film itself are too great to permit handling thereof by conventional apparatus employing standard film reels. Moreover, standard reel locking means for locking the large reels to the standard spindles are ineffective to adequately lock the large reels in place and, as in some instances, to transmit power thereto from the spindles. Moreover, it is extremely difficult to mount large reels on standard apparatus in proper relation to the other parts thereof without causing the same to acquire a very awkward appearance and without being cumbersome.

The primary object of my invention is to provide improved film reel mountings and driving mechanism which will readily accommodate large size reels without the disadvantages heretofore experienced.

More specifically, it is an object of my invention to provide, in moving picture apparatus, improved mechanism for mounting, securing and controlling the operation of large film reels.

A further object of my invention is to provide an improved film reel mounting which will permit facile mounting and removal of the reels.

Another object of my invention is to provide improved film reel mounting mechanism which will permit mounting of large reels in close proximity to each other and thereby permit conservation of space.

Still another object of my invention is to provide improved film reel mounting and driving mechanism which will not require a high degree of precision or accuracy in manufacture but which will, nevertheless, perform in a highly efficient manner.

In accordance with my invention, I mount the large reels upon supports circumferentially spaced about their peripheries or about a circle at a substantial radius from the center thereof with the feed reel and the take-up reel preferably mounted in close proximity to each other and for independent rotation upon a common axis. Suitable driving mechanism is connected to the take-up reel while a brake device controls the rotation of the feed reel. By mounting the reels as aforesaid, the weight thereof and of the film is removed from the central shaft and the reels not only are held more securely in place, but also run more true than would be the case if mounted on but a single center shaft.

The novel features that I consider characteristic of my invention are set forth with particularity in the appended claims. The invention itself, however, together with additional objects and advantages thereof, will best be understood from the following description of several embodiments thereof when taken in connection with the accompanying drawings in which:

Figure 1 is a side elevation of one form of my invention,

Figure 2 is an enlarged fragmentary section on the line II—II of Figure 1 looking in the direction of the appended arrows, Figure 3 is a detail view of the driving mechanism, Figure 4 is a side elevation of a second form of my invention, and Figure 5 is an enlarged fragmentary section on the line V—V of Figure 4 looking in the direction of the appended arrows, and showing a slightly further modification.

Referring more specifically to the drawings wherein similar reference characters indicate corresponding parts throughout, there is shown, in Figures 1 and 2, a film reel bracket or support 1, the hub 3 of which is bored for the reception of a bearing member 5 formed integrally on a wheel 7. A plurality of mounting pins or shafts 9 which are press fit within or otherwise suitably secured to the wheel 7 extend outwardly therefrom in parallel relation and serve as means by which a feed reel 11 is mounted on the support 1 through the openings 12 in the hub 13 thereof. The pins 9 are also parallel to a pin 14 which is press fit within the bore 15 of the bearing member 5 and which extends centrally through the reel 11, a latch member 17 on the pin 14 serving to releasably retain the reel 11 against facile or accidental axial displacement therefrom. It will be noted that the pins 9 engage the reel 11 along a circle at a substantial radius from the axis of rotation of the reel, or the pin 14 (Fig. 1). Thus, the load is entirely removed from the pin 14 and a stable support is provided for the reel 11.

The free end of the bearing member 5 is provided with a reduced neck portion 19 which receives a split collar 21 between which and the wheel 7 the hub 3 is received whereby the parts heretofore described are securely held on the supporting member 1. Secured to the collar 21, as by means of a plurality of screws 23, is a pulley 25 in which are press fit a plurality of pins 27 similar to the pins 9 and adapted to extend through the openings 29 in the hub 31 of a take-up reel 33 whereby the reel 33 is mounted on the pulley 25. The reel 33 is centered upon a pin or shaft 35 which is press fit within the pulley 25 and journaled in the bearing member 5 in axial alignment with the pin 14, a latch member 37 serving to releasably retain the reel 33 on the mounting pins 27 against facile displacement therefrom. As in the case of the pins 9, the pins 27 are also parallel to each other and to the pin or shaft 35.

For driving the take-up reel 33, I provide a motor 39 which drives a pulley 41 through a slip clutch comprising a pair of friction discs 43, 43a in engagement with opposite sides of the pulley 41, the disc 43 being constantly spring pressed against the pulley 41 and the driving disc 43a by a spring 45 the tension of which may be adjusted by a nut 47. The pulley 41 is connected to the pulley 25 by a belt 49. Thus, the reel 33 is positively driven from the motor 39 while the slip clutch permits a change in rotary speed of the reel 33 as the film is wound thereon although the motor 39 operates at a constant speed. At the same time a brake member 51 which cooperates with the peripheral portion of the wheel 7 under the influence of a spring 53 controls the reel 11 and prevents it from over-running. The reels 11 and 33 can, of course, rotate independently of each other upon the common axis represented by the axially aligned pins 14 and 35 by reason of the wheel 7 and its bearing member 5 being journaled in the supporting hub 3 and the pulley 25 with its press fit pin 35 being journaled in the bearing member 5.

In the modifications of my invention shown in Figures 4 and 5, the pins 9a and 9b for the feed reel 11 and the pins 27a and 27b for the take-up reel 33 are mounted directly on the bracket member or support 1. Upon each pin is fitted a spool-shaped sleeve 61, preferably of metal, and each sleeve 61 is surrounded by a second spool 63 which may be of metal, wood, synthetic resin, or the like, but which I preferably make of molded rubber, the sleeves 61 and spools 63 being secured to their respective pins by means of pins 65. The pins 9a, 9b, 27a, and 27b in these modifications are spaced at such a radial distance from the axis of rotation of the reels 11 and 33 that the spools 63 engage the peripheries of the reels when the reels are mounted in place. By mounting the pins 9a and 27a slightly below the horizontal diameters of the respective reels, the weights of the reels and the film will be supported by the three pins shown in each case, but any number of pins may, of course, be employed for further distributing the weight of the loads.

The lowermost pin 9b carries a wheel 67 with which the brake member 51 cooperates as in the case of the modification of Figures 1 and 2, while the lowermost pin 27b has secured thereto a pulley 69 corresponding to the pulley 25. The motor 39 therefore drives the pin 27b through the friction clutch, the belt 49 and the pulley 69, and the spool 61 of the pin 27b in turn frictionally drives the take-up reel 33 at the periphery thereof.

In Figure 4, I have shown the pins 27a and 27b connected by a T-shaped member 71. This serves to prevent the reel 33 from axial displacement, and a second similarly-shaped member may be provided for the pins 9a and 9b to prevent axial displacement of the feed reel 11. In such case, the reels are mounted in place and are removed in the manner indicated by the arrows A. It is possible, however, to dispense entirely with the T-shaped members 71, as in Figure 5, when the spools 63 are made of rubber and the flanges 73 are fairly large. In such case, the flanges 73 serve to prevent accidental or facile displacement of the reels in an axial direction, and the reels may be mounted in place or removed, either in the manner indicated by the arrows A, or by lateral displacement against the yieldable flanges 73 in the manner indicated by the arrows B and C.

From the foregoing, it will be apparent to those skilled in the art that I have provided a reel mount which will readily support large reels and their heavy loads and which will permit the reels to be properly driven. Many modifications other than those described will, no doubt, suggest themselves to those skilled in the art. My invention, therefore, is not to be limited except insofar as is necessitated by the prior art and by the spirit of the appended claims.

I claim as my invention:

1. In film handling apparatus, the combination of a pair of reels, a support therefor, means for mounting said reels on said support in adjacent relation for independent rotation about a common axis, said means engaging the respective reels at a plurality of circumferentially spaced points along a circle at a substantial radius from said axis, and means for releasably locking the respective reels on their respective mounting means against facile axial displacement therefrom.

2. In film handling apparatus, the combination of a pair of reels, a support therefor, means for mounting said reels on said support in adjacent relation for independent rotation about a common axis, said means engaging the respective reels at a plurality of circumferentially spaced points along a circle at a substantial radius from said axis, means for releasably locking the respective reels on their respective mounting means against facile axial displacement therefrom, and means for positively rotating at least one of said reels.

3. In film handling apparatus, the combination of a pair of reels, a support therefor, means for mounting said reels on said support in adjacent relation for independent rotation about a common axis, said means engaging the respective reels at a plurality of circumferentially spaced points along a circle at a substantial radius from said axis, means for releasably locking the respective reels on their respective mounting means against facile axial displacement therefrom, means for positively rotating one of said reels, and means for controlling the rotation of the other of said reels.

4. In film handling apparatus, the combination of a pair of reels, a support therefor, means for mounting said reels on said support in adjacent relation for independent rotation about a common axis, said means engaging the respective reels at a plurality of circumferentially spaced points along a circle at a substantial radius from said axis, means for releasably locking the respective reels on their respective mounting means against facile axial displacement therefrom, means for positively rotating one of said reels, and brake means associated with the other of said reels for controlling the rotation thereof.

5. In film handling apparatus, the combination of a feed reel, a take-up reel, a support for said reels, means for mounting said reels on said support in close proximity to each other and for independent rotation about a common axis, said means engaging the respective reels at a plurality of circumferentially spaced points along a circle at a substantial radius from said axis, means for releasably locking the respective reels on their respective mounting means against facile axial displacement therefrom, means including a slip clutch for imparting rotation to said take-up reel, and brake means associated with said feed reel for controlling rotation of said feed reel.

FRANK E. RUNGE.